W. W. CAMERON.
FERTILIZER DISTRIBUTER.
APPLICATION FILED JULY 14, 1910.

1,093,826.

Patented Apr. 21, 1914.
5 SHEETS—SHEET 1.

W. W. CAMERON.
FERTILIZER DISTRIBUTER.
APPLICATION FILED JULY 14, 1910.

1,093,826.

Patented Apr. 21, 1914.
5 SHEETS—SHEET 2.

W. W. CAMERON.
FERTILIZER DISTRIBUTER.
APPLICATION FILED JULY 14, 1910.

1,093,826.

Patented Apr. 21, 1914.

Witnesses:
Frank W Brun
Hildur C Peterson

Inventor:—
William W. Cameron
By: Fred Gerlach
his Atty.

W. W. CAMERON.
FERTILIZER DISTRIBUTER.
APPLICATION FILED JULY 14, 1910.

1,093,826.

Patented Apr. 21, 1914.
5 SHEETS—SHEET 5.

UNITED STATES PATENT OFFICE.

WILLIAM W. CAMERON, OF LA CROSSE, WISCONSIN, ASSIGNOR, BY MESNE ASSIGNMENTS, TO EMERSON-BRANTINGHAM COMPANY, OF ROCKFORD, ILLINOIS, A CORPORATION OF ILLINOIS.

FERTILIZER-DISTRIBUTER.

1,093,826.  Specification of Letters Patent.  Patented Apr. 21, 1914.

Application filed July 14, 1910. Serial No. 571,985.

*To all whom it may concern:*

Be it known that I, WILLIAM W. CAMERON, a resident of La Crosse, in the county of La Crosse and State of Wisconsin, have invented certain new and useful Improvements in Fertilizer-Distributers, of which the following is a full, clear, and exact description.

The invention relates to fertilizer distributers and designs to provide an improved mechanism for controlling the operation of the several driven mechanisms of the machine, whereby the operator can quickly, conveniently and conjointly cause the several mechanisms of the machine to be rendered inoperative or operative and whereby the speed of the traveling apron may be varied.

The invention further designs to provide a fertilizer distributer of improved construction.

The improved machine comprises front wheels 10, rear wheels 11 mounted on an axle 12 and a suitable box-body 13 for containing the fertilizer. The body may be mounted upon the carrying-wheels in any suitable manner, as well understood in the art. An endless apron 14, usually formed of slats carried by endless chains 15, is mounted so that its upper reach will form the bottom of the body which contains the fertilizer and serves to feed the material to the distributer mechanism or beater at the rear thereof, as well understood in the art. The endless apron 14 is mounted at its front end on sprocket-wheels 16 which are on a shaft 17, which is suitably journaled at the front of the machine, being adjustable so the slack in the apron may be taken up. At its rear, the apron travels around and is mounted to travel on, sprocket-wheels 18 secured to a drive-shaft 19 which is journaled in brackets 20 and 21 secured to the body 13.

Figures 9, 12:
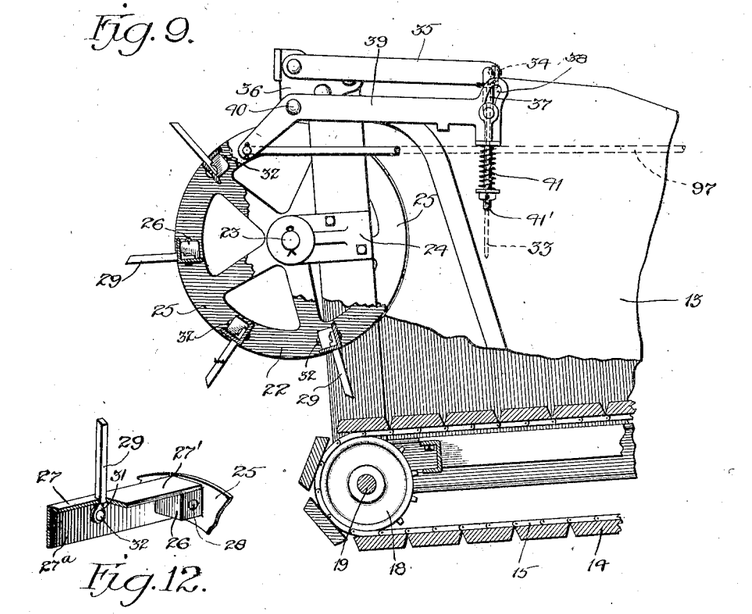
Fig. 9 is a view partly in elevation and partly in section of the beater and the retarder.
Fig. 12 is a detail perspective of a portion of the beater.
Figures 10, 11:
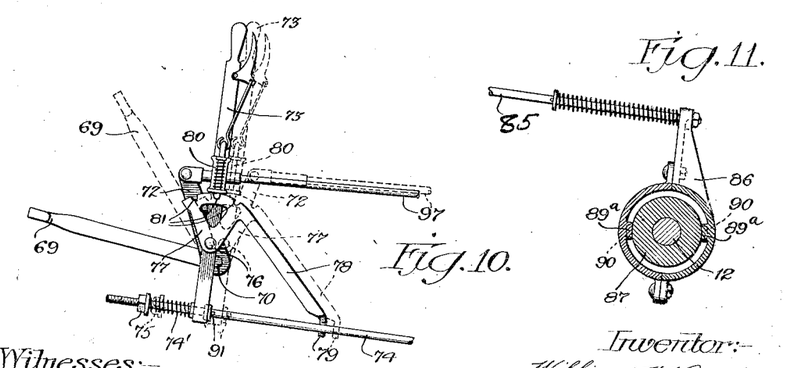
Fig. 10 is a detail of the improved controlling mechanism for the variable speed apron driving mechanism.
Fig. 11 is a detail section of the shifter for the beater driving mechanism.

A beater 22 is journaled above and adjacent the rear end of the feed-apron 14, being secured to a drive-shaft 23 which is journaled in bearings 24 secured to the body 13. This beater comprises ends 25 provided with inwardly extending lugs 26, angle-bars 27 secured to said lugs by rivets 28 and beater-teeth 29. In practice, it is desirable that these teeth should be firmly secured to the bars 27 and be supported as nearly as possible to their outer ends, so that they will not readily become broken in operation. To attain this result, the teeth are usually formed of wrought metal, such as square bars, and are extended through correspondingly shaped perforations in the outer and circumferentially extending web 27' of bars 27 and the inner ends of these teeth are flattened, as at 31, and secured against the inner face of the radially extending web or flange 27ª of bars 27, by bolts or rivets 32. In practice this has been found to be a durable and inexpensive construction.

Figure 1:
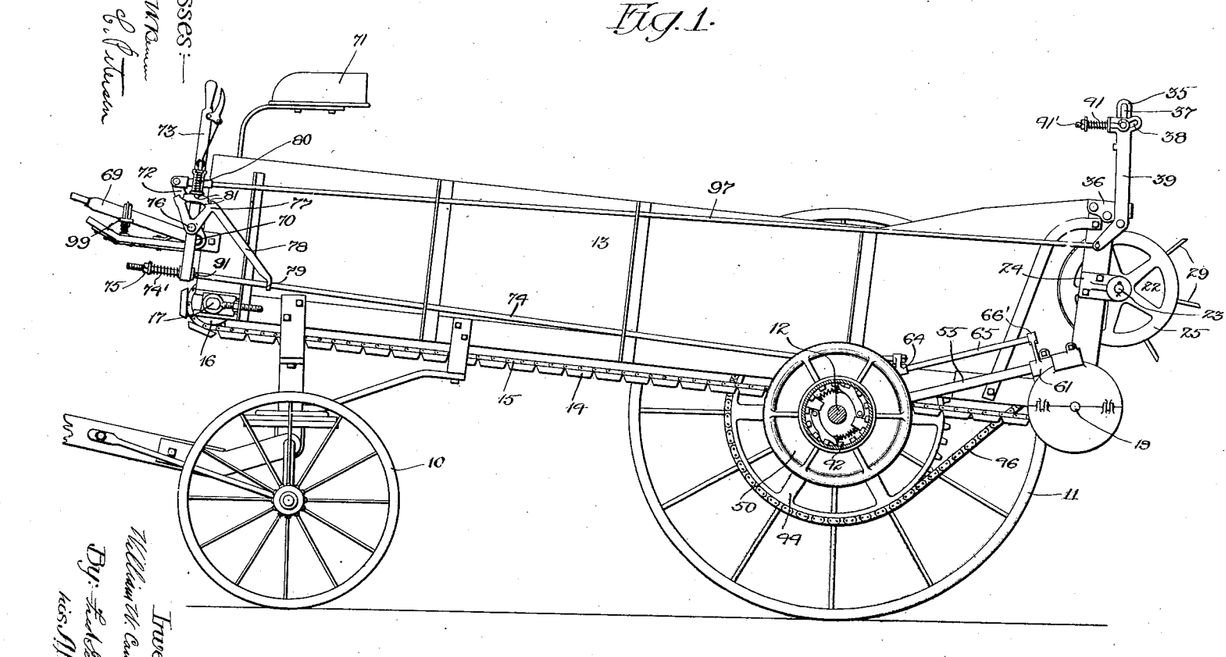
Figure 1 is a side elevation of one side of a machine embodying the invention, one of the carrying-wheels
25 being removed.
Figure 2:
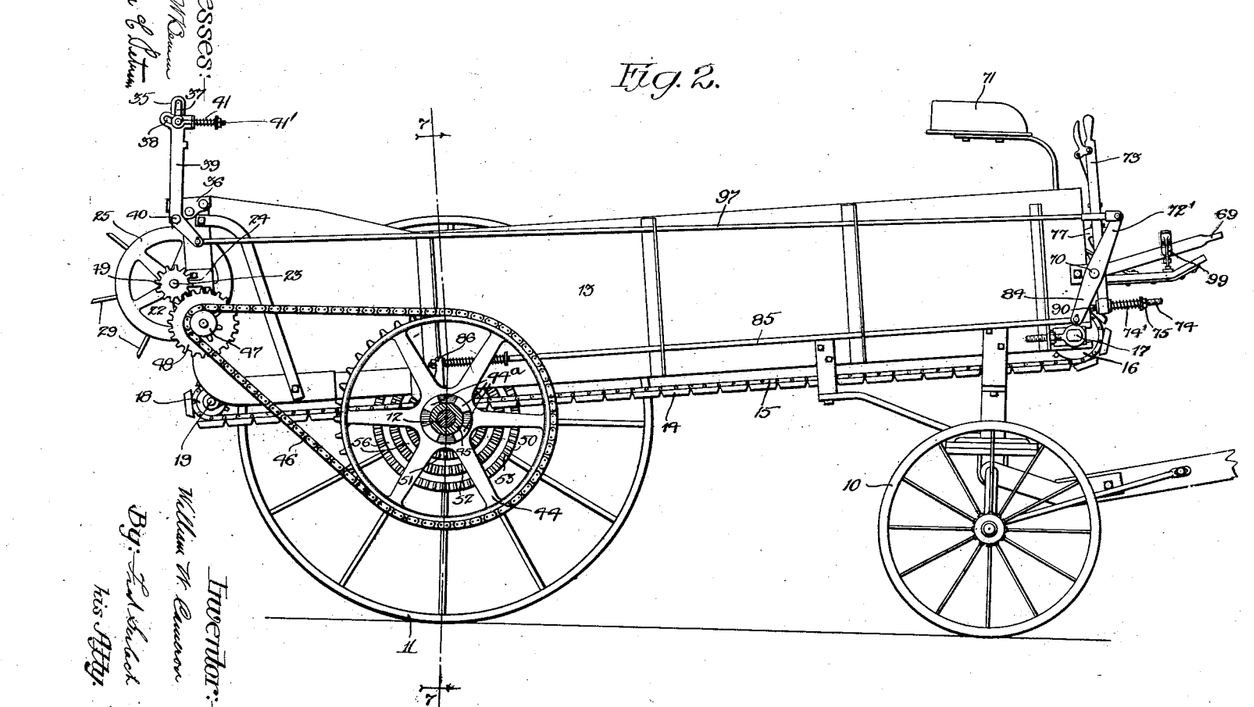
Fig. 2 is a similar view of the opposite side of the machine.
Figure 3:
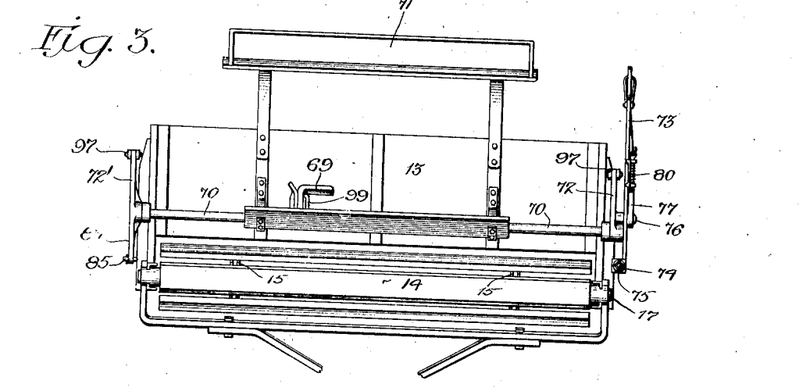
Fig. 3 is a partial front elevation.

A series of retarding teeth are mounted so they can be raised into position above the beater when the machine is in operation and can be lowered to a position forwardly of the beater when the machine is being loaded or the beater is not in operation. The retarder teeth 33 are rigidly secured to a cross-bar 34 which extends through and is pivoted in arms 35 which are pivoted to brackets 36 on the body 13. Cranks 37 on the ends of bar 34 respectively are provided with studs which extend through slots 38 in levers 39, respectively, which are pivoted at 40 in brackets 36. Springs 41 are applied to arms 37, respectively, by means of eye-bolts 41' which are pivoted on the studs on cranks 37, extend through lugs on levers 39, respectively, and are provided with nuts, springs being applied between said lugs and the nuts. When the levers 39 are operated from the horizontal position illustrated in Fig. 9, cranks 37 on cross bar 34 will be swung relatively to arms 35 to cause the teeth 33 to assume a substantially vertical position above the beater when the levers 39 are raised, as shown in Fig. 1.

The rear carrying-wheels 11 are mounted on the axle 12 and each of said wheels is provided with a one-way driving connection 42, as well understood in the art, for driving the mechanism of the machine while the wheels are turning in forward direction to permit the wheels to travel backwardly independently of the driving mechanism when the wheels are rotated backwardly. One of these driving-connections operates a clutch-member 43, which is adapted to drive a sprocket-wheel 44 of the mechanism for driving the beater. Said sprocket-wheel is provided with clutch-teeth 44ª adapted to be shifted into engagement with the teeth on sleeve-member 43ª, to render said clutch operative to drive the beater. For this purpose, sprocket-wheel 44 is slidably mounted on the hub 45 of clutch-member 43ª. Sprocket-wheel 44 drives a chain 46 which drives a small sprocket-wheel 47 secured to a gear 48 which meshes with a pinion 49 on the beater-shaft 23. Resultantly, when in engagement the clutch-member 43ª will drive sprocket-wheel 44 and the beater will be driven as the machine is drawn or propelled forwardly.

Mechanism is provided for driving the apron 14 to feed the fertilizer to the beater, and this mechanism is adjustable so that the apron may be driven at different speeds relatively to the beater to vary the feed of fertilizer distributer thereby. This driving mechanism consists of a main-driving gear 50 adjacent the carrying-wheel at the side opposite to that at which the driving mechanism for the beater is located, and which is driven by one-way connection 42 in the hub of one of the carrying-wheels. This gear-wheel 50 is provided with three annular series of teeth 51, 52 and 53, each of which is adapted to drive a pinion 54 which is slidably mounted on a shaft 55 in such manner that it may be brought, into engagement with either of said series of teeth, or into the channels 56 formed between these series of teeth, so that the driving mechanism for the apron may be driven at different relative speeds by said series of teeth respectively and may also be rendered inoperative when said gear-wheel 54 is shifted into the channels between said series of teeth. Pinion 54 is provided with a key slidably fitted in a groove formed in shaft 55, whereby the pinion may be adjusted longitudinally along the shaft, so that the latter will be driven when the pinion is in engagement with either of the series of gear-teeth 51, 52 and 53. Shaft 55 has one of its ends mounted in a journal 58 formed on a collar 59 which is secured on a bracket 60 through which the axle 12 extends, and which is secured to the body 13. The rear end of said shaft is mounted in a bearing 61 which is secured to the body 13. A worm-wheel 62 is secured to the rear end of shaft 55 and meshes with a gear-wheel 63 on the apron-driving shaft 19. When gear-wheel 54 meshes with either of the series of teeth 51, 52 and 53, the apron will be driven to feed the material to the beater and when said gear-wheel is disposed between any two series of teeth of the gear-wheel 50, the beater will remain stationary. A shifter 64 is slidably mounted on a rod 65, which is secured in a lug 66 on bracket 59 and in a projecting lug 66′ on journal 61. Said shifter extends into a groove 68 in the hub of gear-wheel 54 and serves to shift said gear longitudinally on its shaft 55, which may be done, while the shaft is being driven.

In practice, it is desirable, in order to place the different mechanisms under convenient control of the operator, that the driving mechanism for the beater and for the apron should be conjointly controlled, so that when one is rendered inoperative, the other will also be and it is also desirable that the retarder should be lowered into position to guide the loading of the material into the body 13 when the beater and apron are not to be operated. For this purpose a main-controlling lever 69, capable of being operated by foot action and secured to a cross-shaft 70 is in convenient reach of the operator on seat 71. This cross-shaft is connected to control the driving mechanism for the apron, the driving mechanism for the beater and the retarder, and to lower the latter when said driving mechanisms are rendered inoperative. In order to permit this to be done, mechanism is necessary which will render the driving mechanism for the apron inoperative when the latter is being driven by either of the several series of gears on gear-wheel 50 and it is also desirable that this gear-mechanism should be adjustable either while the driving mechanism is either in operative or inoperative position so that, when the apron is being driven at any of its different speeds and the machine is to be rendered inoperative, and no matter what position the gear-wheel 54 may be in relatively to the gear-wheel 50 when the machine is operative, the gear-wheel 54 may be operated to render the driving mechanism for the apron operative or inoperative correspondingly to the other mechanisms.

Figure 5:
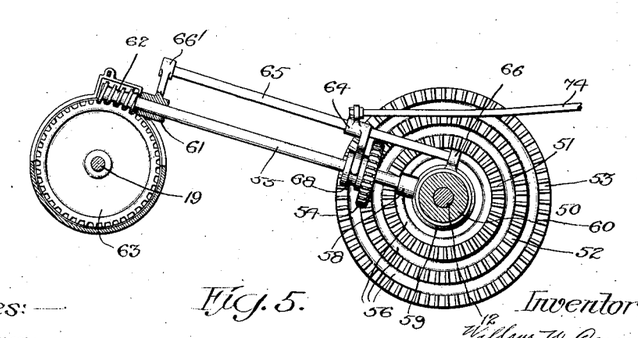
Fig. 5 is a detail of the variable speed mechanism for driving the apron.
Figure 6:
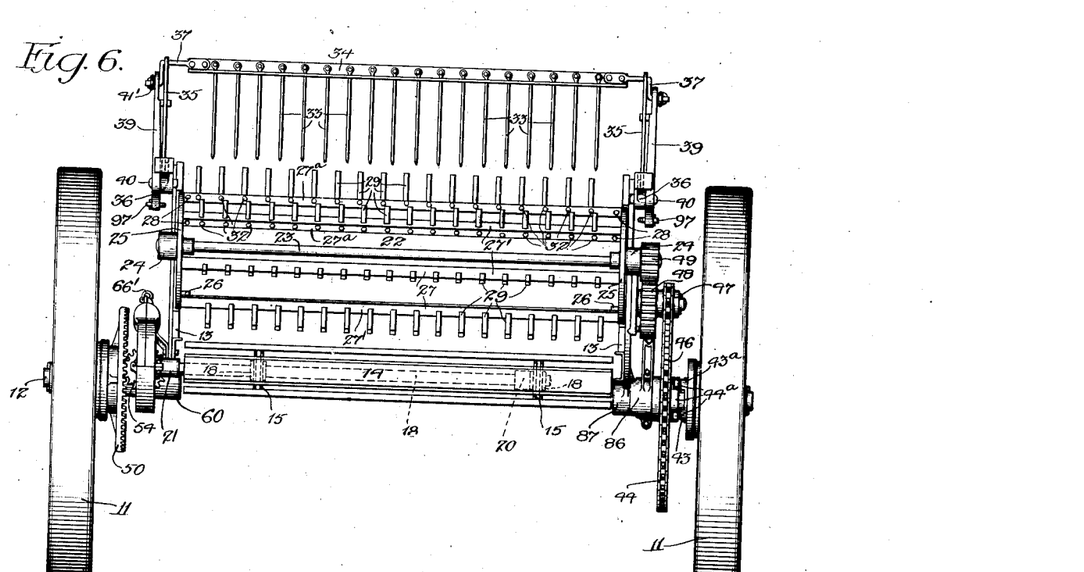
Fig. 6 is a rear elevation.
Figures 7, 8:
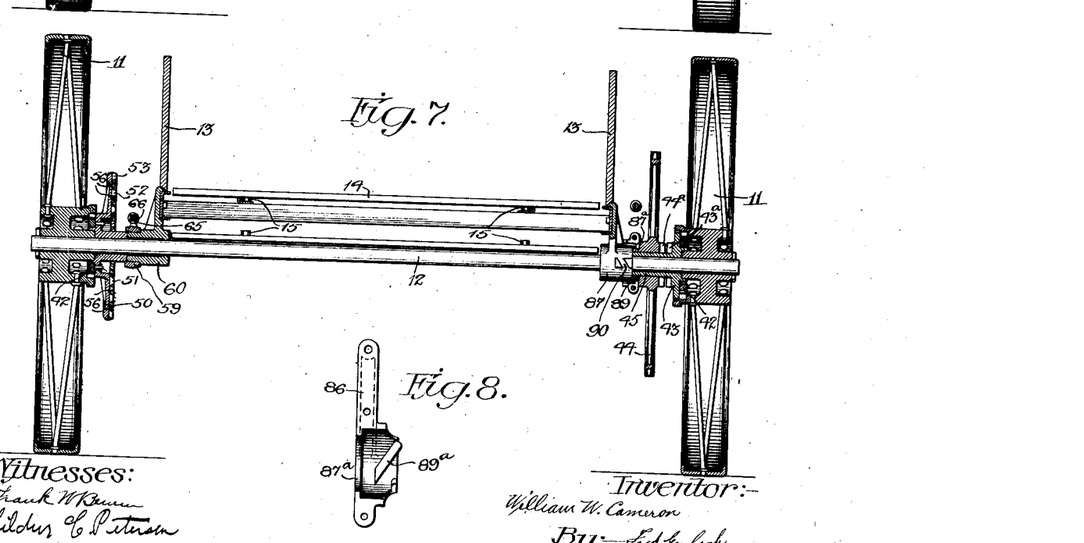
Fig. 7 is a section on line 7—7 of Fig. 2.
Fig. 8 is a detail view of the clutch shifter for the clutch which operatively connects one of the carrying-wheels to the beater driving-mechanism.

The controlling mechanism for shifting gear 54 by means of main-lever 69, comprises an arm 72 rigidly secured to one end of shaft 70, a lever 73 pivoted to said arm eccentrically with respect to shaft 70, as at 76, and a rod 74 which extends loosely through the lower end of said lever and is yieldingly and slidably connected thereto by a spring 74' which engages a nut 75 on said rod and the lower end of lever 73 to yieldingly operate the rod 74 to bring pinion 54 into engagement with the teeth on gear 50. Shift of rod 74 in rearward direction by lever 73, is positively effected by engagement of the lower end of said lever with a pin or abutment 91 on said rod, so that when rod 74 is shifted backwardly to disengage the gear mechanism for the apron, it will be positively shifted and when lever 73 is moved forwardly to bring the sliding gear 54 into engagement with one of the series of teeth on wheel 50, spring 74' will permit rod 74 to yield to give the gear-teeth an opportunity to be brought into proper relative position to permit them to be slipped into engagement, and to avoid possible breakage of the teeth from quick operation if the gear-teeth are not relatively disposed to pass into engagement. The rear end of rod 74 is connected to the shifter 64 (Fig. 5). When arm 72 is rocked, by means of shaft 70, and foot-lever 69 fulcrum 76 of lever 73 will be shifted. A rack 77 is pivoted to arm 72 concentrically with hand-lever 73, at 76, and is provided with an extension or arm 78 which embraces, as at 79, the shifter-rod 74, and this arm serves to control the hand-lever relatively to the shifter-rod 74 when the hand-lever is operated by means of arms 72 and foot-lever 69. Hand-lever 73 is also provided with a finger-lever-controlled spring-pressed locking bolt 80, which is adapted to engage with either of the notches 81 in rack 77 to lock the lever in assigned position relatively to the rack. When hand-lever 73 is locked in the central notch 81 of rack 77, as shown in Fig. 1, rod 74 will hold gear 54 in engagement with the central series of teeth 52 of gear 50 when foot-lever 69, is lowered, and in the groove 56 outside of said teeth when the foot-lever is raised. When hand-lever 73 is locked in the rearmost notch 81 of rack 77, hand-lever 73 will hold rod 74 in position to engage the inner series of teeth 53 of gear-wheel 50 when foot-lever 69 is lowered, and outwardly of the teeth 53 when the foot-lever 69 is raised. When the hand-lever 73 is locked in the foremost notch 81 of rack 77, rod 74 will hold the sliding gear 54 in mesh with outer gear-teeth 51 when foot-lever 69 is lowered, and outwardly of the gear-wheel 50 when the foot-lever is raised. Resultantly, the controlling mechanism may be adjusted to cause the driving mechanism for the apron to be driven at either of the different speeds provided for, and lever 73 will be shifted bodily by the foot-lever 69 to render the sliding gear 54 inoperative from meshing with either of the series of teeth of wheel 50, and into mesh with one of said series of gear-teeth, to render the driving mechanism operative to drive the apron. In shifting lever 73 by the foot-lever 69, it will be observed that the lever is shifted bodily, rather than pivotally since it is held against pivotal movement with arm 72 and shaft 70, by means of the rack-holding arm 78, and the result of a bodily movement of the adjusting-lever, as distinguished from a mainly pivotal movement, is that the throw or stroke of rod 74 will be substantially the same when the hand-lever is locked in either of its positions, while if hand-lever 73 is locked to swing rigidly with arm 72, the stroke of rod 74 would vary according to the angular position of the lever relatively to the rod, so that the sliding-gear 54 would not be accurately shifted between the gear-teeth and might remain or be thrown in engagement with one series of teeth when it should be disposed so as not to be engaged thereby. Resultantly, this controlling mechanism permits the driving mechanism for the apron to be adjusted for different speeds and to be rendered inoperative while being driven at either speed, or to be rendered operative to drive the apron at either speed, by means of a single-lever 69 which also controls the driving mechanism for the beater, and the adjustment of the retarder. This mechanism also provides for accurate and uniform shift of the sliding-gear when its connection is adjusted for either speed.

The controlling mechanism for the beater-driving mechanism comprises an arm 84 which is secured to one end of rock-shaft 70 which is operated by foot-lever 69, a rod 85 pivoted to said arm and extending rearwardly therefrom to a clutch-shifter 86 which is mounted to rotate around bearing bracket 87 of axle 12 and is provided with a rib 87$^a$ fitting into a groove 89 in the hub of sprocket-wheel 44 which is slidably mounted on the hub 45 of the wheel-driven sleeve 43$^a$ and is also provided with cams or spiral ribs 89$^a$ on its inner periphery which slide in correspondingly shaped grooves 90 on bracket 87 so that when the shifter 86 is rotated, it will be shifted inwardly or outwardly by ribs 89 and grooves 99, to correspondingly shift sprocket-wheel 44 to bring its clutch-teeth 44$^a$ into engagement with or to disengage them from the clutch-teeth on the wheel-driven member 43$^a$.

The shifting mechanism for the retarder comprises a rod 97 at one side of the machine, which connects rock-arm 72 which is secured on shaft 70, and a lever 39, and a similar rod 97 at the opposite side of the machine, which is similarly connected to the other lever 39 of the retarder and to an arm 72' secured to rock-shaft 70.

Figure 4:
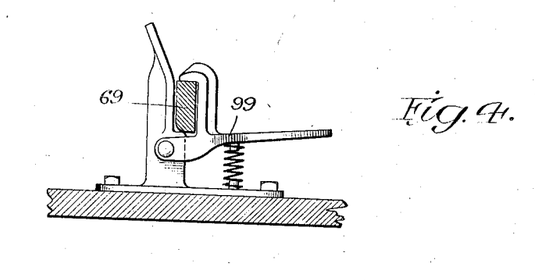
Fig. 4 is a detail of the latch for holding the main-lever in one of its positions.

The operation of the improved machine will be as follows: When main-lever 69 is lowered (Fig. 1), in which position it may be held by a foot operable latch 99 (Fig. 4), rock-shaft 70 will be held so that arms 72, 72' thereon will secure rods 97 in position to hold the retarder raised; arm 84 on said shaft will also hold rod 85 in position to keep sprocket-wheel 44 connected with the wheel driven clutch-member 43ª; and lever 73 which is fulcrumed to the arm 72 will hold rod 74 in such position that sliding-gear 54 of the apron driving mechanism, will be operated by gear-wheel 50, when the hand-lever is locked in either of its three positions. Lever 73 is pivotally connected to said arm 72, and held against pivotal movement by holding-arm 78 and rod 74. When the machine is made inoperative, the operator will, with the heel of his foot, release the latch 99, and with the toe of his foot will raise lever 69, and after initial movement by the toe he may continue the upward movement of the lever by hand if desired. Such shift of the lever will conjointly operate the retarder into lowered position, by means of shaft 70, arms 72, 72', rods 97 and levers 39, the shifter 86 for the clutch for driving the beater to render the clutch inoperative to drive sprocket-wheel 44; and by means of lever 73 carried by arm 72, rod 74 will shift the sliding-gear 54 out of engagement with the teeth on wheel 50. As the machine is driven forwardly and the lever 69 is in lowered position, the beater and apron will be driven at the proper relative speed. To vary the speed of the apron, it is merely necessary to release lock 80 and shift the lever to bring the sliding gear 54 into engagement with the series of gear-teeth on drive-wheel 50 which will drive the apron at the desired speed. When the main-lever 69 is operated, hand-lever 73 will be moved bodily while remaining in substantially the same relation to rod 74, but operating the latter longitudinally, so that a uniform shift or stroke is imparted to said rod, which insures the shift of the sliding-gear 54 into or out of engagement with gear 50 in all of the adjustments of lever 73.

It will be observed that the gear-wheel 56 will be constantly driven when the traction-wheel 11, at one side of the machine, is rotating and that clutch 44ª, 43ª serves as a throw-off for the beater-driving mechanism.

An advantage of the structure set forth is that, when the foot-lever 69 has been operated to render the apron-driving mechanism inoperative, adjusting lever 73 may be operated to shift the pinion 54 into mesh with one of the gear-rings on wheel 50, so that the apron will be driven while the beater remains stationary. When this is done, the apron will be operated, so that its top lap will move toward the beater and in the same direction in which it is operated to feed the material to the beater. This operation will cause the apron to clean itself.

The invention is not to be understood as restricted to the details shown and described, since these may be modified within the scope of the appended claims, without departing from the spirit and scope of the invention.

Having thus described the invention, what I claim as new and desire to secure by Letters Patent, is:

1. In a fertilizer distributer, the combination of an apron, variable-speed driving-mechanism for the apron, a beater, driving-mechanism for the beater, a main-lever, a retarder, and connections whereby said lever will conjointly control the operation of the retarder, the driving mechanism for the beater and the driving-mechanism for the apron, the connection for controlling the variable speed driving mechanism for the apron comprising an adjusting lever for controlling the speed of the apron.

2. In a fertilizer distributer, the combination of an apron, variable-speed driving-mechanism for the apron, a beater, driving-mechanism for the beater, a main-lever, and connections whereby said lever will conjointly control the operation of the driving-mechanism for the beater and the driving-mechanism for the apron, the connections for controlling the variable-speed driving-mechanism for the apron, comprising an adjusting lever for said mechanism.

3. In a machine of the character described, the combination of an apron, variable-speed driving-mechanism for the apron, controlling-mechanism for said driving-mechanism, comprising a main-lever, an adjusting-lever operatively connected to said main-lever, a connection for the variable-speed mechanism, operated by said main-lever through said adjusting-lever, means controlling the movement of the adjusting-lever relatively to the main-lever, when it is shifted to operate the adjusting-lever, to cause bodily shift of the adjusting-lever, a beater, driving-mechanism for the beater, and controlling-means for the beater-driving mechanism, operated by the main-lever.

4. The combination of an apron, variable-speed driving-mechanism for the apron, controlling-mechanism for the driving-mechanism, comprising a main-lever, an arm connected to said lever, an adjusting-lever pivoted to said arm and sustained thereby, a connection between said variable-speed driving-mechanism and the adjusting-lever, and means for controlling the movement of the adjusting-lever relatively to the arm when the arm is shifted to cause bodily shift of the adjusting-lever, a beater, beater-driving mechanism, and controlling-means for the beater-driving mechanism, connected to the main-lever.

5. The combination of an apron, variable-speed driving-mechanism for the apron, controlling-mechanism for the driving-mechanism, comprising a main-lever, an arm connected to said lever, an adjusting-lever pivoted to said arm and sustained thereby, a connection between said variable-speed driving-mechanism and the adjusting-lever, means controlled by said connection for controlling the movement of the adjusting-lever relatively to the arm, a beater, beater-driving mechanism and controlling-means for the beater-driving mechanism, operated by the main-lever.

6. The combination of an apron, variable-speed driving-mechanism for the apron, controlling-mechanism for said driving-mechanism, comprising a main-lever, an adjusting-lever operated by the main-lever, a connection between said lever and the variable-speed mechanism, a rack pivoted concentrically with the adjusting-lever, a lock between the lever and the rack, means whereby said connection will control the rack to cause the adjusting lever to be shifted relatively to and bodily by the main-lever, a beater, beater-driving mechanism, and controlling-mechanism for the beater-driving mechanism connected to said main-lever.

7. The combination of an apron, variable-speed driving-mechanism for the apron, controlling mechanism for the driving-mechanism, comprising a main-lever, an arm operated by said lever, an adjusting-lever pivoted to said arm, a rod connected to the adjusting-lever, a rack pivoted to move relatively to said arm, when the arm is operated, an arm between the rack and said rod for controlling the movement of the rack relatively to the arm, a lock between the rack and the adjusting-lever, a beater, beater-driving mechanism, and controlling-mechanism for the beater-driving mechanism connected to, and operated by said main-lever.

8. The combination of an apron, variable-speed driving-mechanism for the apron, controlling-mechanism for said driving-mechanism, comprising a main-lever, an adjusting-lever having its fulcrum operatively connected to said main-lever, a connection between the adjusting-lever and the variable-speed mechanism, means for controlling movement of the adjusting-lever about its fulcrum when it is shifted by the main-lever to cause bodily shift of the lever, a retarder, and retarder-shifting means connected to, and operated by, said main-lever.

9. In a machine of the character described, the combination of an apron, variable-speed driving-mechanism for the apron, controlling-mechanism for said driving-mechanism, comprising a main-lever, an adjusting-lever operatively connected to said main-lever, a connection for the variable-speed mechanism operated by said main-lever through said adjusting-lever, and means for controlling the relative movement of the adjusting-lever when it is shifted by said lever, a beater, driving-mechanism for the beater, controlling mechanism for the beater-driving mechanism operated by the main-lever, a retarder, and retarder shifting mechanism operated by, said main-lever.

10. The combination of an apron, variable-speed driving-mechanism for the apron, controlling mechanism for the driving-mechanism, comprising a main-lever, an arm connected to said lever, an adjusting-lever pivoted to said arm, a connection between said variable-speed driving-mechanism and the adjusting-lever, and means for controlling the pivotal movement of the adjusting-lever when it is shifted by the arm, to cause bodily shift of the adjusting-lever, a beater, beater-driving mechanism, controlling mechanism for the beater-driving mechanism, connected to the main-lever, a retarder, and retarder-shifting mechanism operated by, the main-lever.

11. The combination of an apron, variable-speed driving mechanism for the apron, controlling mechanism for the driving mechanism, comprising a main-lever, an arm connected to said lever, an adjusting-lever pivoted to said arm, a connection between said variable-speed driving mechanism and the adjusting-lever, means controlled by said connection for controlling the movement of the adjusting-lever relatively to the arm when the latter is operated, a beater, beater-driving mechanism, controlling mechanism for the beater-driving mechanism, operated by the main-lever, a retarder, and retarder-shifting mechanism operated by the main-lever.

12. The combination of an apron, variable-speed driving mechanism for the apron, controlling-mechanism for said driving-mechanism, comprising a main-lever, an adjusting-lever operated by the main-lever, a connection between said adjusting-lever and the variable-speed mechanism, a rack pivoted concentrically with the adjusting-lever, a lock between the lever and the rack, means controlled by said connection for controlling the rack to cause the lever to be shifted relatively to the main-lever, a beater, beater-driving mechanism, controlling mechanism for the beater-driving mechanism connected to said main-lever, a retarder, and retarder-shifting mechanism operated by the main-lever.

13. In a fertilizer distributer, the combination of an apron, variable speed-driving mechanism for the apron, a beater, driving-mechanism for the beater, a clutch for controlling the operation of the beater-driving mechanism, a main lever, connections whereby said lever will conjointly control the operation of the driving-mechanism for the beater and the driving-mechanism for the apron, and means whereby the apron-driving mechanism may be rendered operative to drive the apron in the direction to move the material thereon toward the beater when said clutch is inoperative to drive the beater.

14. In a fertilizer distributer, the combination of an apron, variable speed-driving mechanism for the apron, a beater, driving-mechanism for the beater, a clutch for controlling the operation of the beater-driving mechanism, a main lever, and connections whereby said lever will conjointly control the operation of the driving mechanism for the beater and the driving mechanism for the apron, comprising an adjusting lever operated by the main lever and operable independently to render the apron-driving-mechanism operative when said clutch is inoperative to drive the beater.

WILLIAM W. CAMERON.

Witnesses:
C. W. Dickinson,
C. F. Sutor.

Copies of this patent may be obtained for five cents each, by addressing the "Commissioner of Patents, Washington, D. C."